2,736,722

ACRYLONITRILE-ACRYLYLCARBAMATE COPOLYMERS AND PRODUCTS

John A. Price, Stamford, Conn., assignor to American Cyanamid Company, New York, N. Y., a corporation of Maine No Drawing. Application November 13, 1952, Serial No. 320,347

9 Claims. (Cl. 260—77.5)

This invention relates to the production of new materials having valuable and characteristic properties that make them especially suitable for use in industry, for example in molding, casting, coating, electrically insulating and adhesive applications, and for other purposes. More particularly the invention is concerned with compositions comprising a fiber-formable copolymer of copolymerizable ingredients including (1) an alkyl acrylylcarbamate represented by the general formula

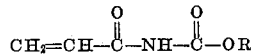

where R represents an alkyl radical containing from 1 to 4 carbon atoms, inclusive, and (2) acrylonitrile, the alkyl acrylylcarbamate of (1) constituting from about 3% to about 20% by weight of the total amount of (1) and (2). The scope of the invention also includes products comprising the polymerized composition obtained by polymerization of the polymerizable composition, as well as method features whereby new and useful synthetic compositions, more particularly copolymers are obtained.

Various copolymers of acrylonitrile with other monomers were known prior to my invention. It also was known that homopolymers and certain copolymers of acrylylcarbamates could be produced by polymerization of monomeric acrylylcarbamate or mixtures thereof with certain other ethylenic monomers. However, to the best of my knowledge and belief, it was not known or suggested that new and valuable copolymer compositions could be produced by copolymerization of copolymerizable ingredients including acrylonitrile and a lower alkyl acrylylcarbamate of the kind embraced by the aforementioned formula, and wherein the acrylylcarbamate constitutes from about 3% to about 20%, more particularly from about 5% to about 20%, by weight of the total amount of the said acrylylcarbamate and acrylonitrile in the said copolymer. By using these particular comonomers in the particular range of proportions given hereinbefore, copolymers are produced that can be formed into fibers having valuable properties.

It is a primary object of the present invention to prepare a new class of copolymers or interpolymers for use in industry.

Another object of the invention is to improve the usefulness of lower alkyl acrylylcarbamates, which also may be described as lower alkyl acrylylurethans, whereby their field of utility is enhanced.

Other objects of the invention will be apparent to those skilled in the art from the description and examples which follow.

The foregoing objects are attained by copolymerization of a mixture of copolymerizable monomers including acrylonitrile and a lower alkyl acrylylcarbamate, e. g., methyl acrylylcarbamate, ethyl acrylylcarbamate, n-propyl acrylylcarbamate, isopropyl acrylylcarbamate, n-butyl acrylylcarbamate, isobutyl acrylylcarbamate, sec.-butyl acrylylcarbamate and tert.-butyl acrylylcarbamate, in proportions thereof, by weight, ranging from about 3% to about 20% of the latter to about 97% to about 80% of the former. Heat, light or heat and light can be used to effect or to accelerate polymerization of the mixture of comonomers, although under such conditions the rate of polymerization may be relatively slow. Hence, it is usually preferred to accelerate the polymerization by employing a polymerization catalyst accompanied by heat, light or heat and light. Ultraviolet light is more effective than ordinary light.

Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dilauryl peroxide, dioleyl peroxide, distearyl peroxide, di-(tert.-butyl) peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic per-acids, e. g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxide and of other catalysts that can be employed are given in Drechsel and Padbury Patent No. 2,550,652 dated April 24, 1951.

The concentration of the catalyst employed is usually small, that is, for the preferred catalysts from, by weight, about 0.5 or 1 part of catalyst per thousand parts of the polymerizable composition to be polymerized to about 3 or 4 or more parts of catalyst per 100 parts of the monomer or mixture of comonomers.

If desired, the mixed monomers can be polymerized in emulsion or in solution state to yield a copolymer. In the latter case, various inert organic solvents may be employed, depending upon the particular comonomer used, e. g., toluene, xylene, dioxane, ethers (e. g., dibutyl ether), esters (e. g., butyl acetate), chlorobenzene, ethylene dichloride, ketones (e. g., methyl ethyl ketone), tertiary alcohols, for instance tertiary-butyl alcohol, tertiary-amyl alcohol, tertiary-hexyl alcohol, etc., as well as others. When the reaction is effected in solution state, then a temperature at or approaching the boiling temperature of the solution generally is used. The copolymer can be separated from the liquid medium in which copolymerization was effected by any suitable means, e. g., by filtration, centrifuging, solvent extraction, etc.

The polymerization also can be effected by conventional bulk polymerization technique, in the presence or absence of a solvent capable of dissolving the monomeric mixture and in which the latter preferably is inert; or in solution in a solvent in which the monomeric mixture is soluble but the copolymer is insoluble; or by conventional bead polymerization methods. The polymerization of the mixture of monomers can be effected by a continuous process as well as by a batch operation. In the preferred method of copolymerization the monomers are copolymerized in an aqueous medium, with the aid of a polymerization catalyst, and the resulting copolymer is then isolated by any suitable means, e. g., by filtration, centrifuging, etc., from the aqueous medium in which polymerization has been effected.

The temperature of polymerization of the polymerizable composition, at atmospheric or slightly above atmospheric pressure and in the presence or absence of a polymerization catalyst, can be varied over a wide range, up to and including or slightly above the boiling point (at atmospheric pressure) of the monomeric mixture (or of the lowest boiling component thereof), but in all cases is below the decomposition temperature of the monomeric materials. In most cases the polymerization temperature will be within the range of 15° C. to 150° C., more particularly within the range of 20° C. or 30° C. (ordinary room temperature) to 130° C., depending, for example, upon the particular mixture of monomers employed, the particular catalyst, if any, used, the rapidity of polymerization wanted, and other influencing factors.

In order that those skilled in the art may better understand how the present invention can be carried into effect, the following examples are given by way of illustration and not by way of limitation. All parts and percentages are by weight.

Example 1

A reaction vessel, equipped with a stirrer, reflux condenser, thermometer and gas-inlet tube is placed in a constant-temperature bath which is maintained at 35° C. To the vessel is added a solution of 42.4 parts of acrylonitrile, 10.6 parts of ethyl acrylylcarbamate (acrylylurethan) and 800 parts of dimineralized water. The pH of the solution is 3.4. A rapid stream of prepurified nitrogen is passed over the surface of the solution for 30 minutes. The nitrogen flow is then reduced to about 2 or 3 bubbles per second. A reduction-oxidation catalyst system ("redox" system) is prepared by dissolving 1.71 parts of ammonium persulfate and 0.71 part of sodium meta-bisulfite, each in 100 parts of water. The catalyst solutions are added portion-wise to the reaction vessel at 25-minute intervals over a period of 2½ hours. After a total reaction period of 6 hours, the copolymer which forms is collected on a Büchner funnel, washed with 1,000 parts of dimineralized water and dried in an oven at 70° C. for 16 hours. Fifty-two (52) parts of a dry, white copolymer of acrylonitrile and ethyl acrylylcarbamate is obtained. A film cast from a 15% solution of this copolymer in dimethyl formamide is clear, tough and pliable.

Example 2

The same procedure is followed as described under Example 1 with the exception that 50.35 parts of acrylonitrile is used instead of 42.4 parts and 2.65 parts of methyl acrylylcarbamate is employed instead of 10.6 parts of ethyl acrylylcarbamate. Also, the polymerization period is 4 hours instead of 6 hours. Fifty (50) parts of a dry, white copoylmer of acrylonitrile and methyl acrylylcarbamate is obtained.

Example 3

To a reaction vessel equipped with a reflux condenser are added 9 parts of acrylonitrile, 0.5 part of isopropyl acrylylcarbamate, 0.5 part of methyl acrylate, 90 parts of water and 0.2 part of potassium persulfate. The solution is heated on a steam bath for 2 hours. The resulting copolymer, more particularly a tripolymer or ternary interpolymer, is collected on a Büchner funnel and dried to a constant weight in an oven at 70° C. which requires about 2 hours. A dry, white tripolymer of acrylonitrile, isopropyl acrylylcarbamate and methyl acrylate is obtained in a yield amounting to about 9.6 parts.

Example 4

To a reaction vessel equipped with a reflux condenser are added 19.4 parts of acrylonitrile, 0.6 part of n-butyl acrylylcarbamate, 80 parts of water and 0.2 part of ammonium persulfate. The resulting solution is heated on a steam bath for 1 hour, after which the copolymer that forms is collected on a Büchner funnel and dried in an oven at 70° C. as described in the preceding example. The yield of dry, white copolymer of acrylonitrile and n-butyl acrylylcarbamate amounts to 18.6 parts.

Example 5

Nineteen (19) parts of acrylonitrile, 1 part of isobutyl acrylylcarbamate, 80 parts of water and 0.2 part of potassium persulfate are added to a reaction vessel equipped with a reflux condenser. The solution is heated on a steam bath for 1 hour. The product is collected on a Büchner funnel and dried as described in Example 3. A dry, white copoylmer of acrylonitrile and isobutyl acrylylcarbamate is obtained in a yield amounting to 18.4 parts.

Example 6

The same procedure is followed as described under Example 1 with the exception that 50.35 parts of acrylonitrile is used instead of 42.4 parts and 2.65 parts of ethyl acrylylcarbamate is employed instead of 10.6 parts. Also, the period of copolymerization is 4 hours instead of 6 hours. Fifty (50) parts of a dry, white copolymer of acrylonitrile and ethyl acrylylcarbamate is obtained.

Example 7

To a reaction vessel equipped with a reflux condenser are added 9 parts of acrylonitrile, 0.5 part of ethyl acrylylcarbamate, 0.5 part of acrylamide, 90 parts of water and 0.2 part of potassium persulfate. The solution is heated on a steam bath for 2 hours after which the tripolymer which forms is collected on a Büchner funnel and dried to a constant weight as described in Example 3. The yield of dry, white tripolymer of acrylonitrile, ethyl acrylylcarbamate and acrylamide amounts to 9.4 parts.

Example 8

A spinning solution is prepared by dissolving 475 parts of an acrylonitrile-ethyl acrylylcarbamate copolymer (obtained by polymerizing a mixture of 95% acrylonitrile and 5% ethyl acrylylcarbamate as described under Example 6) in a concentrated aqueous solution of sodium thiocyanate (about 50% NaSCN in water). The resulting solution is filtered, placed under vacuum and allowed to deaerate for 3 days. The concentration of copolymer in this solution is about 9.5%.

The spinning solution thereby obtained is spun into a fiber by extruding it through a spinneret having 40 holes, each 90 microns in diameter, into a coagulating bath comprising water maintained at a temperature of about 0° C. The freshly spun fiber in gel state is continuously passed over a pair of converging wash rolls while it is advancing in a helical path. The fiber is rinsed with water on the rolls to remove excess thiocyanate. The washed fiber is stretched 650% by passing it through a bath of hot water maintained at a temperature of about 99.5° C., followed by drying on converging drying rolls while it is moving in a helical path toward the take-off end as is more fully described in Cresswell et al. Patent No. 2,558,733.

It will be understood, of course, by those skilled in the art that my invention is not limited to the specific ingredients named in the above illustrative examples nor to the particular proportions and methods of copolymerization mentioned therein. Thus, other modifying comonomers, in addition to the methyl acrylate named in Example 3 and the acrylamide specified in Example 7 can be used. Illustrative examples of such comonomers are vinyl compounds which are different from acrylonitrile (vinyl cyanide) including the vinyl aromatic and isopropenyl aromatic compounds, more particularly the different vinyl aromatic and isopropenyl aromatic hydrocarbons (e. g., the various dialkyl styrenes, isopropenyl toluene, etc.), other aliphatic compounds containing a $CH_2=C<$ grouping, e. g., the various substituted acrylonitriles (e. g., methacrylonitrile, ethacrylonitrile, phenylacrylonitrile, etc.), the various substituted acrylamides (e. g., methacrylamide, ethacrylamide, the various N-substituted acrylamides and N-substituted alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the ethyl, propyl, isopropyl, n-butyl, isobutyl, sec.-butyl, tert.-butyl, amyl hexyl, heptyl, octyl, decyl, dodecyl, etc., esters of acrylic, methacrylic, ethacrylic, phenylacrylic, etc., acids including the alkyl acrylates containing not more than four carbon atoms in the alkyl grouping, examples of which are given above, as well as other vinyl aromatic and vinyl aliphatic compounds, and other compounds containing a $CH_2=C<$ grouping, more particularly a single $CH_2=C<$ grouping.

The proportions of any modifying comonomer or comonomers that are incorporated in the polymerizable composition together with the acrylonitrile and the lower alkyl acrylylcarbamate can be varied considerably. Ordinarily, however, the acrylonitrile constitutes a major or preponderant proportion (more than 50%) by weight of monomers to be copolymerized, the acrylylcarbamate constitutes from about 3% to about 20% of the total weight of the acrylonitrile and acrylylcarbamate, and any modifying comonomer or comonomers (if present in the polymerizable mixture) constitutes the remainder of the total amount of comonomers which are subjected to copolymerization.

In the preferred copolymer compositions (more particularly thermoplastic copolymer compositions) of the present invention, the acrylonitrile is employed in the mixture of comonomers in an amount such that at least 80% by weight of combined acrylonitrile is present in the copolymer. When the polymerization rates of the acrylonitrile and additional monomer or monomers are different from each other, then it may be necessary to start with an amount of acrylonitrile either more or less than 80% by weight of the total mixture of monomers in order that the final copolymer will contain at least 80% by weight of combined acrylonitrile in the copolymer molecule. Similarly, in order that the finished copolymer shall contain, in the copolymer molecule, from about 3% to about 20% by weight of lower alkyl acrylylcarbamate, preferably between about 5% and about 10 or 15%, it may be necessary to start with an amount of the said acrylylcarbamate, either more or less than that which is present in the finished copolymer in order that the said copolymer will have the ultimate composition desired or required in order to impart optimum fiber-forming characteristics thereto.

Although the new copolymers of this invention are particularly useful in the formation of fibers or filaments having improved properties over that provided by homopolymeric acrylonitrile, they also have numerous other applications in the plastics and coating arts. For instance, with or without a filler or other additive, they may be used as molding compositions (or as components of molding compositions) from which molded articles are produced by molding the compositions under heat and pressure, e. g., temperatures of the order of 130° C. or 140° C. to 200° C. and under pressures up to 10,000 pounds or more per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions can be used in the production of castings of any desired shape or size; as adhesives; in the treatment of paper or paper stock; in coating compositions; and for various other purposes. The copolymer can be formed in situ after application of the monomeric mixture to the base material to be coated, impregnated or otherwise treated.

Fibers can be produced from the copolymers of the present invention in the manner described in, for example, Cresswell Patents 2,558,730 and 2,558,731 and Cresswell and Wizon Patent 2,558,733.

I claim:

1. A composition comprising a fiber-formable copolymerizable ingredients including (1) an alkyl acrylylcarbamate represented by the general formula

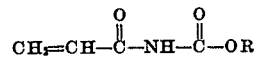

where R represents an alkyl radical containing from 1 to 4 carbon atoms, inclusive, and (2) acrylonitrile, the alkyl acrylylcarbamate of (1) constituting from about 5% to about 20% by weight of the total amount of (1) and (2).

2. A composition as in claim 1 wherein R in the formula for the alkyl acrylylcarbamate of (1) represents a methyl radical.

3. A composition as in claim 1 wherein R in the formula for the alkyl acrylylcarbamate of (1) represents an ethyl radical.

4. A composition as in claim 1 wherein R in the formula for the alkyl acrylylcarbamate of (1) represents a propyl radical.

5. A composition as in claim 1 wherein R in the formula for the alkyl acrylylcarbamate of (1) represents a butyl radical.

6. The method of preparing a new fiber-formable copolymer which comprises polymerizing in an aqueous medium, with the aid of a polymerization catalyst, a mixture of comonomers including (1) an alkyl acrylylcarbamate represented by the general formula

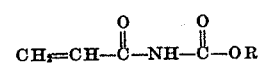

where R represents an alkyl radical containing from 1 to 4 carbon atoms, inclusive, and (2) acrylonitrile, the alkyl acrylylcarbamate of (1) constituting from about 3% to about 20% by weight of the total amount of (1) and (2), and isolating the resulting copolymer.

7. A fiber formed from a fiber-formable copolymer of copolymerizable ingredients including (1) an alkyl acrylylcarbamate represented by the general formula

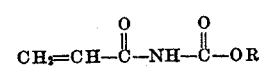

where R represents an alkyl radical containing from 1 to 4 carbon atoms, inclusive, and (2) acrylonitrile, the alkyl acrylylcarbamate of (1) constituting from about 3% to about 20% by weight of the total amount of (1) and (2).

8. A product comprising a fiber-formable copolymer of copolymerizable ingredients including (1) an alkyl acrylylcarbamate represented by the general formula

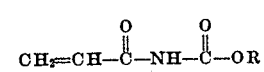

where R represents an alkyl radical containing from 1 to 4 carbon atoms, inclusive, and (2) acrylonitrile, the alkyl acrylylcarbamate of (1) constituting from about 3% to about 20% by weight of the total amount of (1) and (2).

9. A product comprising a fiber-formable copolymer of copolymerizable ingredients including (1) ethyl acrylylcarbamate and (2) acrylonitrile, the ethyl acrylylcarbamate of (1) constituting from about 3% to about 20% by weight of the total amount of (1) and (2).

References Cited in the file of this patent

UNITED STATES PATENTS

| | | |
|---|---|---|
| 2,311,548 | Jacobson | Feb. 16, 1943 |
| 2,401,549 | Chenicek | June 4, 1946 |
| 2,409,126 | Kenyon et al. | Oct. 8, 1946 |

OTHER REFERENCES

PB 33,081, Office Technical Services, frames 3180 and 3181.

Schildknecht: Vinyl and Related Polymers, page 321; Wiley, 1952 (copyrighted, Feb. 20, 1952).